(12) United States Patent
Kumar et al.

(10) Patent No.: US 6,740,359 B2
(45) Date of Patent: May 25, 2004

(54) AMBIENT CURE FAST DRY SOLVENT BORNE COATING COMPOSITIONS

(75) Inventors: Uday Kumar, Philadelphia, PA (US); Patrick H. Corcoran, Cherry Hill, NJ (US); Cesar A. Rodrigues, Porto Alegre (BR)

(73) Assignees: E. I. du Pont de Nemours and Company, Wilmington, DE (US); Renner Dupont Tintas Automotives E Industrials S.A., Guarulhos (BR)

( * ) Notice: Subject to any disclaimer, the term of this patent is extended or adjusted under 35 U.S.C. 154(b) by 0 days.

(21) Appl. No.: 10/057,118

(22) Filed: Jan. 25, 2002

(65) Prior Publication Data

US 2002/0161162 A1 Oct. 31, 2002

Related U.S. Application Data

(60) Provisional application No. 60/266,807, filed on Feb. 6, 2001.

(51) Int. Cl.[7] .............................. B05D 3/02; C08G 59/58
(52) U.S. Cl. ............ 427/386; 106/287.22; 106/287.24; 106/287.25; 528/93; 528/112; 528/113; 528/119; 528/121; 528/176; 528/183
(58) Field of Search .............................. 427/386; 528/93, 528/112, 113, 119, 121, 176, 183; 525/403, 408, 423, 523, 533; 106/287.22, 287.24, 287.25

(56) References Cited

U.S. PATENT DOCUMENTS

| | | | |
|---|---|---|---|
| 4,772,680 A | | 9/1988 | Noomen et al. |
| 4,906,684 A | * | 3/1990 | Say .............................. 524/548 |
| 5,021,537 A | | 6/1991 | Stark et al. |
| 5,288,802 A | | 2/1994 | Walters et al. |
| 5,288,804 A | * | 2/1994 | Kim et al. .................. 525/154 |
| 5,332,785 A | | 7/1994 | Brindoepke |
| 5,344,897 A | | 9/1994 | Brindoepke et al. |
| 5,451,653 A | * | 9/1995 | Chen et al. .................. 525/374 |
| 5,567,761 A | * | 10/1996 | Song .......................... 524/523 |
| 5,753,756 A | | 5/1998 | Aerts et al. |
| 6,297,320 B1 | * | 10/2001 | Tang et al. .................. 525/107 |

FOREIGN PATENT DOCUMENTS

| | | |
|---|---|---|
| DE | 2621423 | 12/1997 |
| EP | 0967198 A1 | 12/1999 |
| EP | 0969030 A1 | 5/2000 |
| EP | 1036492 A1 | 9/2000 |
| WO | WO 96/37563 * 11/1996 | ............ C09D/5/00 |
| WO | WO 99/60065 | 11/1999 |
| WO | WO 99/61538 A1 | 12/1999 |
| WO | WO 00/10964 A1 | 3/2000 |
| WO | WO 00/31196 A1 | 6/2000 |
| WO | WO 00/54568 A1 | 9/2000 |
| WO | WO 00/68331 A1 | 11/2000 |

OTHER PUBLICATIONS

Copy of the Notification of Transmittal of the International Search Report.

* cited by examiner

Primary Examiner—Daniel S. Metznaier
Assistant Examiner—Jeffrey B. Robertson
(74) Attorney, Agent, or Firm—Sudhir G. Desmukh

(57) ABSTRACT

The present invention is directed to fast dry ambient temperature curable coating compositions especially suited for use in automotive refinish applications. A binder component of the two pack coating composition includes an epoxy resin having at least one acetoacetate functionality and at least one epoxy group, and one or more reactive components provided with at least two acetoacetate functionalities. Some of the suitable reactive components include structured reactive diluent, an acrylic polymer, a polyester, or a combination thereof. A crosslinking component of the coating composition includes polyamine, a blocked polyamine or a mixture thereof. The present invention is further directed to a method of producing a coating on a substrate from the coating composition.

20 Claims, No Drawings

AMBIENT CURE FAST DRY SOLVENT BORNE COATING COMPOSITIONS

CROSS REFERENCE TO RELATED APPLICATION

This application claims benefit of a provisional application Ser. No. 60/266,807, filed Feb. 6, 2001.

FIELD OF THE INVENTION

The present invention generally relates coating compositions suitable for use in automotive refinish applications and more particularly related to fast dry ambient temperature curable coating compositions.

BACKGROUND OF THE INVENTION

A number of clear and pigmented coating compositions are utilized in various coatings, such as, for example, primers, basecoats and clearcoats used in automotive refinish coatings, which are generally solvent based. In repairing damage, such as dents and scratches to autobodies, the original coating in and around the damaged area is typically sanded or ground out by mechanical means. Some times the original coating is stripped off from a portion or off the entire autobody to expose the substrate (e.g., bare metal) underneath. After repairing the damage, the repaired surface is coated, typically in portable or permanent low cost painting enclosures vented to the atmosphere to remove the organic solvents from the freshly applied paint coatings in an environmentally safe manner. Generally, the drying and curing of the freshly applied paint takes place within these enclosures. Furthermore, it is preferable to conduct the foregoing drying and curing steps within the enclosure to prevent the wet paint from collecting dirt in the air or other contaminants.

As these paint enclosures take up significant floor space of typical small autobody paint repair shops, these shops prefer to dry and cure these paints as rapidly as possible. More expensive enclosures are frequently provided with heat sources, such as conventional heat or infra red lamps located inside the enclosure to cure the freshly applied paint at accelerated rates. Therefore, to provide more cost effective utilization of shop floor space and to minimize fire hazards resulting from wet coatings from solvent based coating compositions, there exists a continuing need for fast curing coating formulations which cure under ambient conditions while still providing outstanding performance characteristics such as solvent resistance. Several attempts have been made to address the aforedescribed problem. U.S. Pat. No. 5,332,785 discloses a coating composition based on a polyepoxide containing acetoacetate groups and a polyamine in the form of the corresponding aldimine or ketimine. However, a need still exits for fast drying coating compositions that have sufficient sandability in shorter dry times.

STATEMENT OF THE INVENTION

The present invention is directed to a coating composition comprising:
a binder component comprising:
  (i) an epoxy resin having at least one acetoacetate functionality and at least one epoxy group, and
  one or more reactive components provided with at least two acetoacetate functionalities, said reactive component being selected from the group consisting of a structured reactive diluent, an acrylic polymer, a polyester, and a combination thereof; and
  (ii) a crosslinking component selected from the group consisting of a polyamine, a blocked polyamine and a mixture thereof, wherein said polyamine has an average of at least two amine functionalities per polyamine molecule and wherein said blocked polyamine has an average of at least two imine functionalities per molecule.

The present invention is further directed to a method of producing a coating on a substrate comprising:
mixing a binder component with a crosslinking component of a coating composition to form a pot mix,
wherein said binder component comprises:
  (i) an epoxy resin having at least one acetoacetate functionality and at least one epoxy group, and
  (ii) one or more reactive components provided with at least two acetoacetate functionalities, said reactive component being selected from the group consisting of a structured reactive diluent, an acrylic polymer, a polyester, and a combination thereof; and wherein said crosslinking component selected from the group consisting of a polyamine, a blocked polyamine and a mixture thereof, wherein said polyamine has an average of at least two amine functionalities per polyamine molecule and wherein said blocked polyamine has an average of at least two imine functionalities per molecule;
applying a layer of said pot mix over a substrate surface; and
curing said layer under ambient conditions to form said coating on said substrate.

Optionally in some coating applications, it may be preferable to incorporate within the curable composition an organosilane material for enhanced performance and adhesion properties.

Optionally, the coating can be used in low VOC applications.

The ratio of the number of equivalents of primary/secondary amino groups or a combination thereof of polyamine or blocked polyamine to the number of equivalents of total acetoacetate is between 0.3 to 2.5.

The acetoacetate containing epoxy resin is present in the range of 5 to 90 weight percent, preferably in the range of 15 to 70 and most preferably in the range of 15 to 60 weight percent of total binder component solids.

The other acetoacetate containing binder component (structured reactive diluent and/or polymer) is present in the range of 5 to 90 weight percent, preferably in the range of 15 to 70 weight percent and most preferably in the range of 15 to 60 weight percent of total binder component solids.

The coating composition includes in the range of 10 to 90 percent of the crosslinking component, preferably in the range of 15 to 70 weight percent and most preferably in the range of 15 to 60 weight percent of total binder solids. Polyketimine is the preferred.

"Low VOC coating composition" means a coating composition that has in the range of 0.6 to 0.3, preferably 0.21 to 0.25 kilograms of organic solvent per liter (1.3 to 2.5, preferably 1.8 to 2.1 pounds of organic solvent per gallon) of the composition, as determined under the procedures provided in ASTM D3960.

Ambient cure conditions is defined as the temperature range of 12° C. to 45° C. (55° F. to 110° F.) and a humidity range of 15% to 90% that is present in the spraying area. This does not refer to the temperature and humidity of the spray line.

The present invention is an ambient cure coating composition (also usable at higher bake temperatures) with the following advantages:

a) Fast dry times especially with low VOC coating compositions. Dry time is defined as the minimum time required to wet sand a pigmented tack free coating, typically of the order of 15 minutes.

b) Reduced time to dry sand especially in low VOC coating compositions. This is the minimum time needed to dry sand following application of the coating over the substrate. Typically of the order of 1 hour.

and the products of chlorination and bromination of the abovementioned compounds. Bisphenol A and bisphenol F are preferred in this respect. The epoxy resins made by Shell Chemical Company under the trade mark Epon® epoxy resins are useful in this invention.

The bisphenol A based resins shown in the formula below are particularly useful:

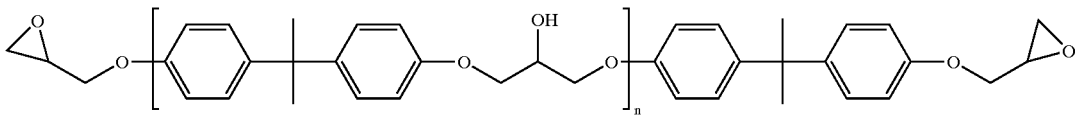

c) Superior solvent resistance and resistance to water or moisture.

Acetoacetate Containing Epoxy Resins

The acetoacetate containing epoxy resins are obtained by reacting hydroxyl containing polyepoxide either completely or partially with acetoacetic acid derivatives. The reaction of hydroxyl groups with acetoacetic acid derivatives such as t-butylacetoacetate or ethylacetoacetate is carried out as a transesterification reaction. U.S. Pat. No. 5,332,785 provides more details, which is incorporated herein by reference. A more detailed treatment on this subject can be found in a paper by Witzman et al Journal of Coatings Technology, Vol 62, No. 789, 1990.

The acetoacetate containing epoxy resin is present in the range of 5 to 90 weight percent, preferably in the range of 15 to 70 and most preferably in the range of 15 to 60 weight percent of total binder component solids.

The weight average molecular weight of the hydroxyl containing polyepoxy resins as determined by GPC using polystyrene standards is in the range of 100 to 30,000, preferably in the range of 100 to 15,000, more preferably in the range of 100 to 10,000. The polyepoxy resins have hydroxyl numbers in the range of 20 to 1800, preferably in the range of 50 to 1500 and most preferably in the range of 100 to 1000. The Tg of the hydroxyl containing polyepoxy resins are in the range of –60° C. to 150° C., preferably in the range of –40° C. to 100° C., more preferably in the range of –30° C. to 80° C.

The preferred hydroxyl containing polyepoxy resins are polyglycidyl ethers based on dihydric, alcohols, phenols, hydrogenation products of these phenols and/or novolaks (reaction products of mono- or polyhydric phenols with aldehydes, in particular formaldehyde, in the presence of acidic catalysts). The epoxy equivalent weights of these polyepoxy resins are preferably in the range of 100 to 5000, more preferably in the range of 100 to 4000 and most preferably in the range of 100 to 3500. Polyhydric phenols can also be used to make hydroxyl containing polyepoxy resins. Examples of polyhydric phenols are: resorcinol, catechol, hydroquinone, bis(4-hydroxyphenyl)-1,1-isobutane, 2,2-bis(4-hydroxyphenyl)propane (bisphenol A), isomer mixtures of dihydroxydiphenylmethane (bisphenol-F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4-hydroxyphenyl)isobutane, 2,2-bis(4-hydroxy-tert-butylphenyl)propane, bis(2-hydroxynaphthyl)methane, 1,5dihydroxynaphthalene, tris(4-hydroxyphenyl)methane, bis(4-hydroxyphenyl) ether, bis(4-hydroxyphenyl) sulfone;

These above mentioned hydroxy containing polyepoxy resins can also be used in mixtures with one another and, if appropriate, in mixtures with monoepoxides. Examples of suitable monoepoxides are: epoxidized monounsaturated hydrocarbons (butylene oxide, cyclohexene oxide, styrene oxide), epoxide ethers of monohydric phenols (phenol, cresol and other o- or p-substituted phenols), and glycidyl esters of saturated and unsaturated carboxylic acids.

A detailed listing of the suitable epoxy compounds can be found in the handbook "Epoxidverbindungen und Epoxidharze" (Epoxide Compounds and Epoxy Resins) by A. M. Paquin, Springer Verlag, Berlin 1958, Chapter IV, in Lee, Neville "Handbook of Epoxy Resins", 1967, Chapter 2, and Wagner/Sarx, "Lackkunstharze" (Synthetic Coating Resins), Carl Hanser Verlag (1971), p. 174 et seq., all of which is incorporated herein by reference.

Acetoacetate Containing Acrylic Polymers

The acetoacetoxy functional acrylic polymers useful in this invention are addition polymers prepared by the conventional polymerization of one or more ethylenically unsaturated monomers. The acetoacetoxy functional acrylic polymers include 1 percent to 90 weight percent, preferably between 10 to 80 weight percent and most preferably between 15 percent to 60 percent weight of acetoacetate groups. The acetoacetate containing acrylic polymer is present in the range of 5 percent to 90 percent, preferably in the range of 15 percent to 70 percent and more preferably in the range of 15 percent to 60 weight percent of total binder component solids.

The acetoacetate containing acrylic polymer has a GPC number average molecular weight of 1000 to 100000 based on polystyrene as standard, preferably in the range of 2000 to 60,000 and more preferably in the range of 3000 to 40,000. A glass transition temperature of –80° C. to 150° C., preferably in the range of –60° C. to 100° C., more preferably in the range of –40° C. to 60° C.

The acetoacetate containing acrylic polymer can be polymerized from a monomer mixture that includes one or more of the following monomers having one or more acetoacetate groups:

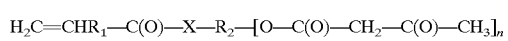

where the group $R_1$ represents a hydrogen atom or a methyl group, the group X an oxygen atom or an NH-group and the group $R_2$ is an organic group having 1 to 26 carbon atoms and n is a number of 2 to 4; the molecular weight of such a monomer unit is generally not higher than 500, preferably 140 to 300. The organic group $R_2$ may contain urethane groups, ether groups and/or ester groups, for example obtained from a lactone, such as ε-caprolactone, or an epoxy compound or isocyanate compound such as an alkylene oxide, glycidol, a glycidyl ester of a monocarboxylic acid containing 2 to 18 carbon atoms or an adduct of a diisocyanate and a diol. These monomer units are obtained for instance by acetoacetylation of an adduct of a lactone, a monoepoxy compound or a diisocyanate reacted with a diol to a hydroxyalkyl (meth)acrylate. Examples of other suitable acetoacetate monomer units include allyl acetoacetate and acetoacetic esters of ethylenically unsaturated diols or triols such as 2-butene-1,4-diacetoacetate and (2-methylene acetoacetyl)-1-propene-3-acetoacetate.

Acetoacetoxy methyl methacrylate, acetoacetoxy ethylmethacrylate, acetoacetoxy propylmethacrylate, and acetoacetoxy butylmethacrylate are preferred.

The acetoacetate functional monomers can be copolymerized with one or more monomers having ethylenic unsaturation. Examples of copolymerizable monomers include acrylic or methacrylic ester of a mono-, di- or polyfunctional hydroxyl compound having 1 to 18 carbon atoms, 0% to 20% by weight of a monoethylenically unsaturated mono- or dicarboxylic acid having 3 to 12 carbon atoms or an anhydride thereof, and 0.01% to 100% by weight of one or more other copolymerizable monomers having ethylenic unsaturation, such as:

a) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, hydroxyethyl acrylate, octyl acrylate, oleyl acrylate, glycidyl acrylate, 3,55-trimethylhexyl acrylate, methyl methacrylate, ethyl methacrylate, propyl methacrylate, butyl methacrylate, isobutyl methacrylate, ethylhexyl methacrylate, amyl methacrylate, hydroxyethyl methacrylate, isopropyl methacrylate, isobornyl methacrylate, glycidyl methacrylate, ethyl tiglate, methyl crotonate, ethyl crotonate etc.

b) styrene based materials such as styrene, α-methyl styrene, vinyl toluene, alpha- ethyl styrene, alpha-bromo styrene etc c) other copolymerizable unsaturated monomers: acrylamide, methacrylamide, acrylonitrile, N-methylol acrylamide, acrylic acid, methacrylic acid, methacrylonitrile, dimethyl maleinate, vinyl acetate, vinyl versatate, vinyl trimethoxy silane and/or allyl glycidyl ether.

Examples of suitable monoethylenically unsaturated mono- or dicarboxylic acids containing 3 to 12 carbon atoms or an anhydride thereof are acrylic acid, methacrylic acid, maleic acid, itaconic acid, maleic anhydride, cinnamic acid or dodecenic acid.

The acrylic polymers may be prepared in any convenient manner, for instance by polymerizing one or more acetoacetate groups containing monomer, optionally mixed with one or more other monomers, at a temperature of 50° C. to 160° C., in the presence of preferably 0.1 to 10% by weight of an initiator, calculated on the monomeric compound(s). Examples of suitable initiators include free radical initiators, for instance potassium persulphate, hydrogen peroxide, cumene hydroperoxide, benyoyl peroxide, ditert. butyl peroxide, tert. butylpertrimethyl hexanoate, tert. butyl perbenzoate, azobisisobutyronitrile, azobisvaleronitrile, azobis(2,4-dimethylvaleronitrile). The polymerization is carried out in the presence of water and/or an organic solvent, such as a ketone, an alcohol, an ether, an ester or a hydrocarbon. The polymerization may optionally be carried out by using UV light and in the presence of UV initiators, such as benzil, benzoin ethers and thioxanthone derivatives.

Alternately a hydroxyl group of a hydroxy functional addition polymer can be converted into acetoacetate group to yield acetoacetate containing acrylic polymer. The reaction of hydroxyl groups with acetoacetic acid derivatives such as t-butylacetoacetate or ethylacetoacetate is carried out as a transesterification reaction. U.S. Pat. No. 5,332,785 provides more details, which is incorporated herein by reference. The hydroxyl groups can also be converted into acetoacetate groups by reacting with diketenes. A detailed treatment on the conversion of hydroxyl groups to acetoacetates is covered in a paper by Witzman et al. Journal of Coatings Technology, Vol. 62, No. 789, 1990.

Suitable hydroxyl groups-containing addition polymers include polymers containing hydroxyalkyl (meth)acrylate and/or hydroxyalkyl acrylate such as hydroxyethyl acrylate, hydroxyethyl methacrylate, hydroxypropyl methacrylate and/or hydroxybutyl acrylate and optionally one or more other comonomers, and copolymers of styrene and allyl alcohol.

Acetoacetate Containing Polyesters

The acetoacetate containing polyester suitable for use in the present invention has a GPC weight average molecular weight of at least about 1000, as determined by gel permeation chromatography using a polystyrene standard. Typically the weight average molecular weight ranges from about 1000 to about 50,000, preferably from about 1000 to about 30,000 and more preferably between 1000 to 15000. The acetoacetate containing polyester has an acetoacetate equivalent weight from about 100 to about 2000 (grams/equivalents), preferably from about 200 to 1500, more preferably from 300 to 1000. The acetoacetate containing polyester is present in the range of 5 percent to 90 percent, preferably in the range of 15 percent to 70 percent and more preferably in the range of 15 percent to 60 weight percent of total binder component solids.

The acetoacetate containing polyester is prepared as the transesterification reaction product of a polyester polyol and an acetoacetic acid derivative. The reaction of hydroxyl groups with acetoacetic acid derivative such as t-butylacetoacetate or ethylacetoacetate is carried out as a transesterification reaction. U.S. Pat. No. 5,332,785 provides more details, which is incorporated herein by reference. A detailed treatment on the conversion of hydroxyl groups to acetoacetates is covered in a paper by Witzman et al. Journal of Coatings Technology, Vol. 62, No. 789, 1990.

The polyester polyol can be prepared by esterification of an organic polycarboxylic acid or anhydride thereof with organic polyol and/or an epoxide. Preferred polycarboxylic acid or anhydride is an aliphatic or aromatic dibasic acid or acid anhydride and the polyol is a diol.

Examples of diols which are usually employed in preparing the polyester polyol include alkylene glycols, such as ethylene glycol, neopentyl glycol and other glycols, such as cyclohexane diol, bisphenol-A, hydrogenated bisphenol-A, cyclohexanedimethanol, the reaction products of lactones and diols, for example, the reaction product of ε-caprolactone and ethylene glycol, hydroxy-alkylated bisphenols, and polyether glycols, for example, poly(oxytetramethylene)glycol.

The di- carboxylic acids or anhydrides used in making polyester polyols have 2 to 18 carbon atoms per molecule. Among the dicarboxylic acids which are useful are phthalic acid, isophthalic acid, terephthalic acid, tetrahydrophthalic acid, hexahydrophthalic acid, methylhexahydrophthalic acid, adipic acid, azelaic acid, sebacic acid, maleic acid, glutaric acid, chlorendic acid and tetrachloophthalic acid. Higher functional polycarboxylic acids, such as trimellitic acid and tricarballylic acid may also be employed.

Other suitable acetoacetate containing polyesters include those produced by reacting isocyanate with excess amount polyester followed endcapping the excess hydroxy groups with acetoacetate acid derivative. The organic polyisocyanate is reacted with the polyol so that the OH/NCO equivalent ratio is greater than 1:1 such that there are resultant free hydroxyl groups and an isocyanate equivalent weight approaching 1,000,000. The organic polyisocyanate which is used in preparing the polyurethane polyols can be of varying types but usually is an aliphatic or aromatic polyisocyanate or a mixture thereof. Diisocyanates are preferred, although higher polyisocyanates such as triisocyanates can be used. Examples of suitable diisocyanates are 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates are polymethylene polyphenyl isocyanates.

Crosslinking Component

The coating composition includes in the range of 10 to 90 percent of the crosslinking component, preferably in the range of 15 to 70 weight percent and most preferably in the range of 15 to 60 weight percent of total binder component solids. The crosslinking component suitable for use in the present invention includes polyamine or blocked polyamine having a GPC weight average molecular weight of at least 100, as determined by gel permeation chromatography using polymethyl methacrylate standards. Typically, the GPC weight average molecular weight ranges from about 100 to about 50,000, preferably from about 150 to about 20,000 and more preferably from about 200 to about 10,000.

The polyamine has an average of at least two amine functionalities per molecule, which may be primary, secondary or a combination of secondary and primary amine functionalities. Preferably, the polyamine has an average of from about 2 to about 25 and more preferably, in the range of from about 2 to about 15 and most preferably in the range of 2 to 10 amine functionalities per polyamine molecule. These amine functionalities may be present either as pendant functionalities or amine functionalities positioned in the backbone of the polymer chain. Pendent amine functionalities are preferred.

Examples of representative polyamines suitable for use in the invention include aliphatic or cycloaliphatic amines, or a combination thereof. The aliphatic polyamine is preferred.

Examples of suitable polyamines include primary and secondary amines, such as, ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl) methylamine, 3-amino-1-(methylamino) propane, 3-amino-1-(cyclohexylamino)propane, and N-(2-hydroxyethyl)ethylene diamine. Ethylenediamine, propylenediamine, butylenediamine and 1,2-diaminocyclohexane are preferred.

Other suitable polyamines include those of the formula:

where the $R_1$ and $R_2$ groups may be the same or different and represent an alkylene group containing 2 to 6 and preferably 2 to 4 carbon atoms and n is an independently selected number in the range of from 1 to 6 and preferably in the range of from 1 to 3. The alkylene group is a cycloalkylene group or an alkylene group containing an ether-oxygen atom. Examples of representative polyamines containing polyalkylene groups include diethylene triamine, dipropylene triamine and dibutylene triamine. It is preferred that these polyamines should be of a cycloaliphatic nature and contain 5 to 15 carbon atoms, such as isophoronediamine; more particularly containing an alpha-aklyl group, such as bis(3-methyl-4-aminocyclohexyl)methane and bis(3-methyl-4-aminocyclohexyl)propane.

The blocked polyamines (polyaldimines and polyketimines) which are suitable for use in the present invention are obtained by blocking the amino groups on the aforedescribed polyamines with a blocking agent, such as an aldehyde or ketone having not more than 18 carbon atoms, preferably 3 to 13 carbon atoms. Examples of suitable blocking agents for the amino groups include acetone, diethyl ketone, methylisobutyl ketone, methyl amyl ketone, methyl isoamyl ketone, methyl propyl ketone, methyl isopropyl ketone, methyl ethyl ketone, isobutyraldehyde, hydroxybutyraldehyde, pentanone, cyclohexanone, ethylamyl ketone, hydroxycitronellal, isophorone and decanone. An aliphatic or cycloaliphatic ketone is preferred and an aliphatic or cycloaliphatic ketone with 3 to 8 carbon atoms is more preferred.

Polyamines or polyketimines can be also obtained by reacting an amino or a molecule having both amino and imino functionality or a combination thereof with:

a polyepoxy resin having 2 to 10 epoxy groups, a polyfunctional isocyanate having 2 to 10 isocyanate groups, maleinate or fumarate esters, acryloyl esters or methacryloyl esters of polyhydroxy compounds having 2 to 10 hydroxy groups, or a combination thereof.

Some of the suitable polyepoxy resins include those containing at least two epoxy groups in the molecule, i.e.,

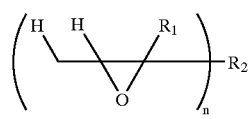

where n is at least two, $R_1$ is hydrogen or methyl, and $R_2$ broadly represents an organic based molecule or polymer typically composed of carbon, hydrogen, oxygen, and optionally nitrogen, sulfur, or both. Hydroxyl substituent groups may also be present, as well as halogen and ether groups. Generally, the epoxy equivalent weight ranges from about 100 to about 4000. These polyepoxides can be broadly categorized as being aliphatic, aromatic, cyclic, alicyclic or heterocyclic.

Another group of useful polyepoxides for use in the present invention includes epoxy novalac resins and their hydrogenation products. These resins are prepared by reacting an epihalohydrin with the condensation product of an aldehyde and a monohydric or polyhydric phenol. One example is the reaction product of epichlorohydrin with a phenolformaldehyde condensate.

Another particularly preferred groups of the polyepoxides are the polyglycidyl ethers of polyhydric aromatic hydroxy compounds, preferably dihydroxy aromatic compounds. Suitable examples of dihydroxy aromatic compounds are resorcinol, catechol, hydroquinone, bis(4-hydroxyphenyl)-1,1-isobutane; 4,4-dihydroxybenzophenone; bis(4-hydroxyphenyl)1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A; isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4-hydroxyphenyl)isobutane, 2,2-bis(4-hydroxy-tert-butylphenyl)propane, bis(2-hydroxynaphthyl)methane, 1,5dihydroxynaphthalene, tris(4-hydroxyphenyl)methane, bis(4-hydroxyphenyl) ether, bis(4-hydroxyphenyl) sulfone or a combination thereof and the products of chlorination and bromination of the above-mentioned compounds. Of the many epoxidizing agents, the one principally utilized is epichlorohydrin although epibromohydrin is also quite useful. The polyglycidyl ethers especially useful herein are obtained by reacting epichlorohydrin and bisphenol A in the presence of an alkali, such as sodium or potassium hydroxide. The series of epoxy resins sold by Shell Chemical Company under the trademark EPON are especially useful herein.

Another group of useful polyepoxy resins are the polyglycidyl ethers of polyhydric alcohols such as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the polyepoxy resins, which are polyglycidyl ethers of polycarboxylic acids. These materials are produced by the reaction of an epoxy compound, such as epichlorohydrin with an aliphatic or aromatic polycarboxylic acid such as oxalic acid; succinic acid; glutaric acid; terephthalic acid; 2,6-naphthalene dicarboxylic acid and dimerized linoleic acid.

Still other groups of polyepoxides are derived from epoxidation of olefinically unsaturated alicyclic materials. Among these are the epoxy alicyclic ethers and esters, which are well known in the art.

Examples of suitable polyisocyanates include aliphatic, cycloaliphatic or aromatic di-, tri- or tetraisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl)benzene a xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

Examples of suitable acryloyl esters or methacryloyl esters of polyhydroxy compounds include diols, triols polyols, polyester diols or polyols and polyether diols or polyols; adducts of on the one hand a hydroxyl group-containing (meth)acrylic ester of a polyol to an at least bifunctional isocyanate compound or epoxy compound on the other; and adducts of (meth)acrylic acid to a bifunctional epoxy compound. For brevity, the compounds envisaged here are hereinafter referred to as poly(meth)acryloyl compound. As examples of suitable (meth)acrylic esters of di-, tri- or polyvalent hydroxyl compounds may be mentioned those of ethylene glycol, propylene glycol, diethylene glycol, tetramethylene diol, neopentyl glycol, cyclohexane diol, hexamethylene diol, cyclohexane diol, 4,4'-dihydroxybenzophenone, bis-(4-hydroxycyclohexane) methane, glycerol, trimethylol ethane, trimethylol propane and pentaerythritol. These esters may optionally contain a hydroxyl group. The hydroxyl group-containing (meth)acrylic esters from which the adduct to the at least bifunctional isocyanate compound or epoxy compound may be formed are the (meth)acrylic esters of polyols, such as those defined hereinbefore.

Structured Reactive Acetoacetate Diluents

The coating composition contains from percent 5 percent to 90 percent, preferably 15 to 70 and more preferably 15 to 60 weight percent of at least one structured reactive acetoacetate diluent, the percentages being in weight percentages of total binder component solids. The structured reactive acetoacetate diluent is substantially free from acrylate functionalities and has at least 2, preferably in the range of from 2 to 30, more preferably 2 to 20 acetoacetate groups. The structured reactive diluent has an acetoacetate equivalent weight (grams/equivalent) from about 50 to about 1000, preferably in the range of 80 to 800 and more preferably in the range of 80 to 600. The structured reactive acetoacetate diluent has a Tg in the range of from $-100°$ C. to $100°$ C., preferably in the range of from $-80°$ C. to $50°$ C. and more preferably in the range of $-70°$ C. to $30°$ C. The structured reactive acetoacetate diluent has a GPC weight average molecular weight in the range of 100 to 30,000, preferably in the range of 200 to 20,000 and more preferably in the range of 200 to 10,000. The reactive acetoacetate diluents of patent application WO 68331 is incorporated herein by reference.

The structured reactive acetoacetate diluents are built in a stepwise fashion to give star shaped molecules of well-defined architecture. The "highly ordered" structure of these reactive diluents make them dramatically different from conventional polyacrylic or polyesters, which are linear or linear with random branching.

The structured reactive acetoacetate diluents are produced by transesterifying a structured hydroxy diluent with acetoacetatic acid derivatives like t-butylacetoacetate. U.S. Pat. No. 5,332,785 provides more details, which is incorporated herein by reference. The conversion of hydroxyl to acetoacetate groups can also be affected by diketene. A detailed treatment on the conversion of hydroxyl groups to acetoacetates is covered in a paper by Witzman et al. Journal of Coatings Technology, Vol. 62, No. 789, 1990.

The simplest of structured hydroxy diluents are di- or polyhydroxy compounds. Examples of polyhydroxy compounds that can be used here include 1,4-cyclohexanedimethanol, ethylene glycol, propylene glycol, dipropylene glycol, 2,2,4-trimethyl 1,3-pentanediol, neopentyl glycol, 1,4 butane diol, 2,3 butanediol, 1,5-pentanediol, 1,6 hexanediol, 2,2-dimethyl-1,3-propanediol, 1,4-cyclohexanedimethanol, 1,3-cyclohexanedimethanol, trimethylene glycol, tetramethylene glycol, hexamethylene glycol, diethylene glycol, 1,4-benzenedimethanol, 1,4-benzenediethanol, 2,4-dimethyl-2-ethylenehexane-1,3-diol, polyols such as trimethylolethane, trimethylolpropane, triethylolpropane, pentarythrytol, dipentaerythrytol, glycerine, tris(2-hydroxyethyl)isocyanu rate (Theic).

An example of producing the foregoing structured reactive acetoacetate diluents from a polyhydroxy compound is shown below:

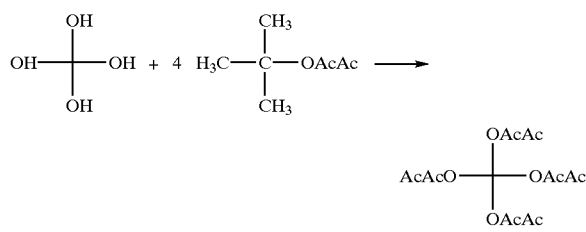

Another example of structured hydroxy diluents is star shaped polyols. The star shaped polyols can be obtained by reaction of a polyfunctional acid (eg. dimethylolpropionic acid) or polyfunctional hydroxy compound (pentaerythritol, trimethylol propane, etc) with a monofunctional epoxide (ethylene oxide, butylene oxide, or any aliphatic epoxide) or a lactone (eg. butyrolactone, ε-caprolactone) or anhydride (eg. methylhexahydrophthalic anhydride, MHHPA) or a combination thereof. The controlled architecture results from the specific sequence of addition of the various reactants. The foregoing polyols have a star shaped structure having at least 2 arms, preferably 3 to 30 arms and more preferably 3 to 20 arms, substituted with hydroxyl groups.

An example of the above type of structured reactive acetoacetate diluent is exemplified below starting from pentaerythrytol and using methylhexahydrophthalic anhydride (MHHPA) and an epoxide to build the star shaped polyol subsequently capped with acetoacetate moieties.

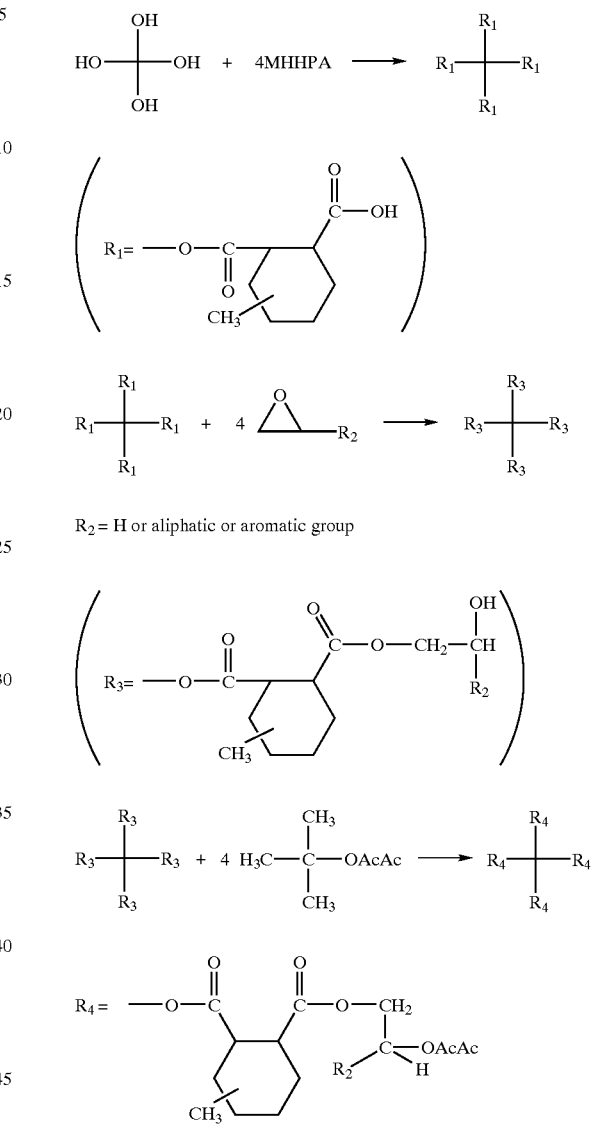

Suitable acid anhydrides that can be used to make star shaped polyol's include succinic anhydride, maleic anhydride, phthalic anhydride, hexahydrophthalic anhydride, methyl hexahydrophthalic anhydride, (MHHPA), trimellitic anhydride, hydrogenated trimellitic anhydride, the Diels-Alder adduct of maleic anhydride with sorbic acid, and the hydrogenated Diels-Alder adduct of maleic anhydride with sorbic acid. Other anhydrides include aliphatic and aromatic cyclic monoanhydrides containing four to 30 carbon atoms. Suitable monoepoxides to make star shaped polyol's include ethylene oxide, butylene oxide, and monoepoxyesters of aliphatic and aromatic acids such as, epoxyesters of benzoic acid, acetic acid, pivalic acid (Cardura™ E5), and versatic acid (Cardura™ E4). Others include aliphatic and aromatic monoepoxides and epoxy esters containing 2 to 30 carbon atoms.

Suitable lactones to make star shaped polyols include caprolactone, butyrolactone, and other aliphatic lactones containing 4 to 30 carbon atoms. The resulting primary or secondary hydroxyl groups generated by the aforedescribed syntheses are subsequently reacted with an acetoacetate compound, such as tert-butyl acetoacetate, to provide compounds that are capped with acetoacetate moieties. Additional information about the hydroxyl analogues and their unique structures is disclosed in the U.S. Pat. No. 5,753,756 to Aerts et al. and in Star Oligomers for low VOC Polyurethane Coatings by Huybrechts et al., in Surface Coatings International, No. 3, 1998, all of which are incorporated herein by reference.

Another unique example of structured hydroxy diluents are dendritic polyols. Dendritic polyols are dendritic molecules having expanded convergent or divergent structures terminated with hydroxyl groups. Dendritic polyols are produced by a multistep synthesis by converging over a simple core or by diverging from a simple core.

The dendritic polyols possess three distinguishing architectural features: a core, interior layers composed of repeating units or generation attached to the core, and an exterior or terminal hydroxyl functionalities attached to the outermost generation. The repeat units or generations are built in a step wise manner one at a time. The following formulas describe the structural details of dendritic polyols having expanded convergent or divergent structures:

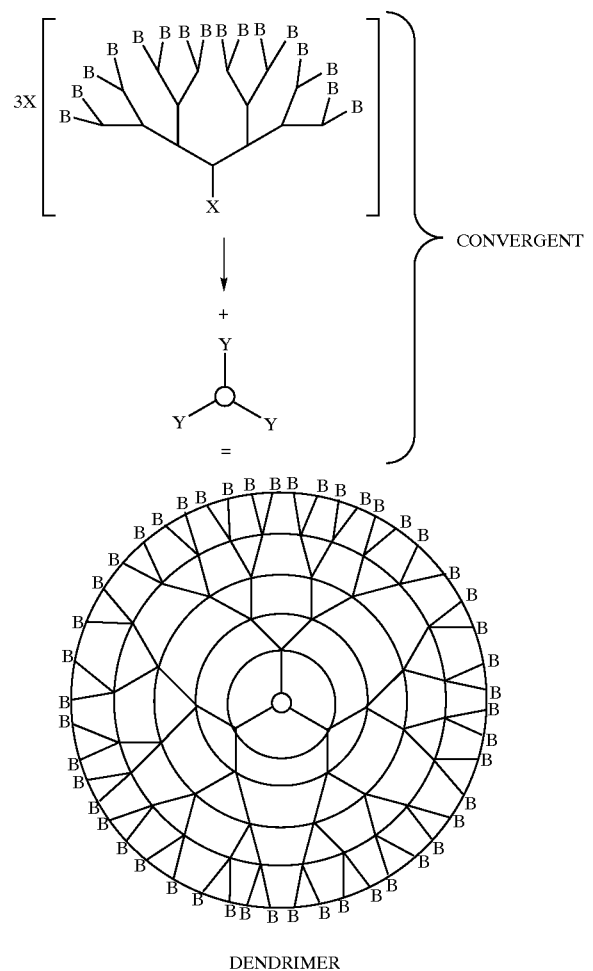

CONVERGENT

DENDRIMER

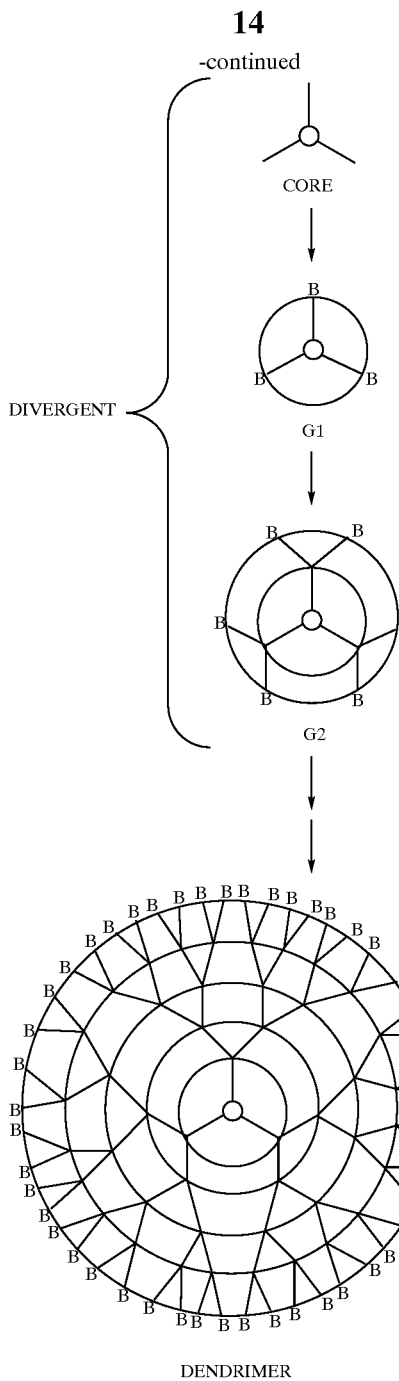

DIVERGENT

DENDRIMER

Unlike conventional polyesters or polyester oligomers, the dendritic polyols possess a dense, compact structure from many short branches below entanglement molecular weight and therefore, relative to conventional materials these types of structures exhibit reduced viscosity because they are essentially entanglement free. Additional details of these dendritic polyols are provided by Hult et al, in *Hyperbranched Aliphatic Polyesters*, Polymeric Materials Encyclopedia, Vol. 5, at page 3171, published by CRC Press, Inc. in 1996; and also by Turner et al. in, *Hyperbranched Polymers*, Polymer News, Vol. 22 at page 197, both of which are incorporated herein by reference.

Still another example of structured hydroxy diluents includes hyperbranched polyols. The hyperbranched polyols are produced in a single step from polymerization of $AB_x$ type monomers. A is a hydrocarbyl radical containing a carboxyl acid (—$CO_2H$), carboxyl ester group (—$CO_2R$), or a combination thereof, wherein R is $C_{1-12}$ alkyl; B is a hydrocarbyl radical containing 1 to 10, preferably 2 to 3, hydroxyl (—OH) or ester group (—$O_2CR'$), wherein R' is $C_{1-12}$ alkyl; and x is in the range of 2 to 10, preferably in the range of 2 to 3. The resulting oligomer or polymer contains one unreacted A functional group and $(x-1)_{n+1}$ number of B functional end groups, wherein n is the degree of polymerization, which varies from 2 to 1000, preferably 2 to 100. The hyperbranched polyols can be additionally modified by copolymerization with the comonomers, such as lactones, hydroxycarboxylic acids, lactams, aminoacids, cyclic ethers and monomers of the general formula R"—$Z_m$, where R" is $C_{1-200}$ hydrocarbyl, Z is hydroxyl, amine, epoxy or carboxyl and m varies from 1 to 10, preferably 2 to 6. Examples of suitable comonomers of the general formula R"—$Z_m$ include dimethylolpropionic acid, caprolactone, caprolactam, pentaerythritol, glycerine, neopentyl glycol, trimethylol propane, cyclodextrine, cyclohexanedimethanol, sorbitol, and hydrogenated bisphenol A. The structural examples of hyperbranched polyols are shown below:

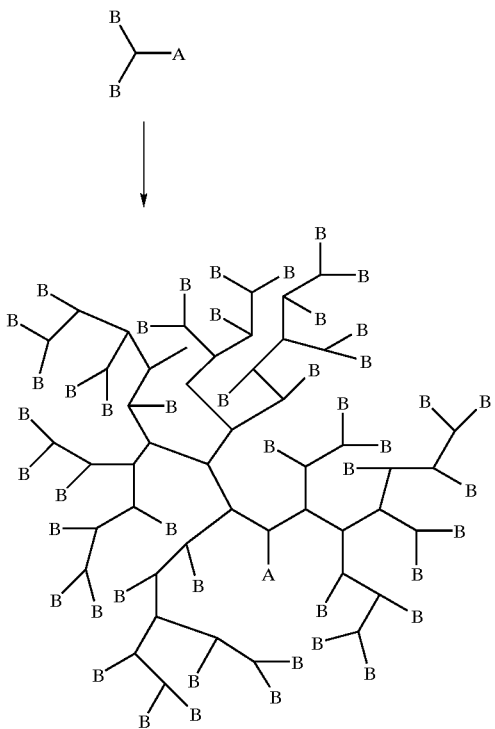

The foregoing materials also exhibit dramatically reduced intermolecular entanglement relative to conventional polyesters.

The coating composition of the present invention, which is formulated into high solids coating systems further contains at least one organic solvent typically selected from the group consisting of aromatic hydrocarbons, such as petroleum naphtha or xylene; ketones, such as methyl amyl ketone, methyl isobutyl ketone, methyl ethyl ketone or acetone; esters, such as butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both components of the binder. The solids level of the coating of the present invention varies in the range of from 5 percent to 100 percent, preferably in the range of from 10 percent to 95 percent and more, preferably in the range of from 25 percent to 85 percent, all percentages being based on the total weight of the coating composition.

The coating composition of the present invention may also contain conventional additives, such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended to be used as a clear coating. The foregoing additives may be added to either the binder or crosslinking component, or both, depending upon the intended use of the coating composition.

In use, the binder and crosslinking components of the coating composition are mixed just prior to use or about 5 to 30 minutes before use to form a pot mix, which has limited pot life, in the range of from 10 minutes to 60 minutes, before it becomes too viscous to permit application through conventional application systems, such as spraying. A layer of the pot mix is typically applied to a substrate by conventional techniques, such as spraying, electrostatic spraying, roller coating, dipping or brushing. The layer of the coating composition then cures under ambient conditions in the range of 10 minutes to 3 hours, preferably in the range of 30 minutes to 60 minutes to form a coating on the substrate having the desired coating properties. It is understood that the actual curing time depends upon the thickness of the applied layer and in the presence or absence of any suitable drying devices, such as fans that assist in continuously flowing air over the coated substrate to accelerate the cure rate. Generally, a layer having a thickness in the range of from 25 micrometers to 300 micrometers applied over a metal substrate, such as automotive body, cures in 30 to 60 minutes under ambient conditions and in the absence of any suitable drying devices. If desired, baking the coated substrate at a temperature of about 60° C. for about 30 minutes may further accelerate the cure rate. The foregoing baking step is particularly useful under OEM (Original Equipment Manufacture) conditions.

The coating composition is suitable for OEM and refinish automotive coatings, such as basecoats, undercoats and clear coats. The composition is also suitable for industrial coatings, such as coil coatings. Some of the specific uses include the following uses:

Woven or non-woven cellulosic or non-cellulosic fabrics; leather or non-leather goods, such as shoes, boots, sandals, sneakers, gloves, hats and upholstery; various sports and athletics related footwear, such as sneakers, running shoes, roller blade shoes; foot ball shoes; sports and recreation equipment, such as golf clubs, balls, tees, skis, jet skis, wet bikes, snowmobiles, skates, hockey rink surfaces, hockey pucks and hockey sticks, bowling alley lanes, bowling pins and balls; fake fruits and dry flowers; fiber optics; packaging materials, such as bottles, beverage cases, food bags and boxes; finger nails and fake finger nails; safety glass, shatterproof glass and eye wear glasses; plasticizer migration resistant coating over vinyl surfaces; furniture, including lawn furniture; roof and roof tiles; textured and soft-feel wall coverings; toys, such as Nerf® ball; light fixtures and bulbs; communications equipment, such as phones, pagers and fax machines; credit cards; luggage and attaches touch screen television tubes, cathode ray tubes and radar screens, liquid crystal and flat panel displays; mirrors; non-skid floorings; sound absorbent acoustical walls, ceilings and seats, acoustical equipment; marine surfaces, such as boat hulls, buoys, jetties, ship decks, sail canvas; office equipment, such as computers, photocopying machines, computer printers; musical instruments, such as piano, guitars, organs; costume jewelry; and bright metallic surfaces.

Due to their durable nature, the coating from the composition of the present invention may be used as durable long life traffic markings on road surfaces, including reflective road markings.

The composition of the present invention may be foamed by conventional means, such as by air or inert gas foaming means, to produce foams, which can be applied over a wide variety of surfaces; cast; molded by conventional means, such as injection molding.

EXPERIMENTAL

The following test procedures were used for generating data reported in the examples below.

Persoz Hardness

The film hardness was measured using a Persoz hardness tester Model No. 5854 (ASTM D4366), supplied by Byk-Mallinckrodt, Conn. The number of oscillations, referred to as Persoz number or Persoz hardness were recorded over time.

Molecular Weight

The molecular weights of the polymers were measured by size exclusion chromatography on Hewlett Packard 1090 High Performance Liquid Chromatography with 1047A RI detector. Microstyragel columns from Waters Inc. with tetrahydrofuran as the mobile phase and polystyrene standards of known molecular weight was used for molecular weight determination.

Solids Measurement

The non-volatile content of resin solutions were measured by removing the solvent of a resin sample in down draft oven at 110° C. until a constant solid weight was obtained.

Gradner-Holdt Viscosity

The Gradner Holdt viscosity of the clear resin solutions were obtained by visually comparing the rate of ascent of bubble in the resin solution against a set of Gardner Holdt bubble tubes (viscosities A5-Z8) in a constant temperature bath maintained at 25° C. The following are the experimental details for the synthesis of various resins used in this study.

Resin 1 (Acetoacetate Functionalized Epon 1004F[1] Epoxy Resin)

The following materials were charged to a glass reactor equipped with stirrer, condenser, distillate adapter and nitrogen sweep.

| Epon 1004F[1] epoxy resin | 100 gms |
|---|---|
| t-butyl acetoacetate | 44.26 gms |

The reactor contents were heated slowly to a temperature of 180 deg C. while distilling off 20.7 gms of t-butylalcohol, followed by the addition of 66.52 gms of methylamylketone.

The non-volatiles tested at 63.45%; Gardner-Holdt viscosity tested as Z1.

1. Epon 1004F was purchased from Shell Chemical Company. t-butyl acetoacetate was purchased from Eastman chemical company.

Resin 2 (Pentaerythrytol Tetra-acetoacetate) Structured Reactive Diluent

The following materials were charged to a glass reactor equipped with stirrer, condenser, distillate adapter and nitrogen blanket.

| Pentaerythrytol | 100.0 gms |
|---|---|
| t-butylacetoacetate | 464.7 gms |

The reactor contents were stirred at 270 rpm and slowly heated to a temperature of 180 deg C. while distilling off 212 gms of t-butylalcohol. The non-volatiles tested at 95.3% and the Gardner-Holdt viscosity tested as L.

Resin 3 (Acetoacetate Functionalized Epon 1001F[2] Epoxy Resin)

The following materials were charged to a glass reactor equipped with stirrer, condenser, vigreaux column, distillate collector and nitrogen sweep.

| Epon 1001F epoxy resin | 100 gms |
|---|---|
| t-butylacetoacetate | 37.18 gms |
| methylamyl ketone | 39.92 gms |
| Sank HCA phosphite additive | 0.69 gms |

The reactor contents were heated slowly with stirring to a temperature of 130 deg C. and held at 130 deg C. while distilling off 15.2 gms of t-butyl alcohol. The non-volatiles tested at 73.17%; Gardner-Holdt viscosity as Z1+1/2.

2. Epon 1001F was purchased from Shell Chemical Company.

Resin 4 (Acetoacetate Containing Acrylic Polymer)

A 12 liter glass reactor equipped with stirrer, condenser, dual above surface feeds and a nirogen blanket was charged with 748.7 gms of n-butyl acetate and heated to reflux. The following solutions (Part A) and (Part B) were prepared and fed simultaneously into the reactor at reflux. Part A was fed over 210 minutes and Part B was fed over 270 minutes. Following the addition of Part B the reactor vessel was held at reflux for 60 minutes.

| Part A | |
|---|---|
| Acetoacetoxyethyl methacrylate | 941.2 gms |
| Hydroxyethyl methacrylate | 161.3 gms |
| n-butyl acrylate | 779.8 gms |
| Isobornyl methacrylate | 806.7 gms |
| n-butyl acetate | 26.7 gms |
| Part B | |
| t-butylperoxy-2-ethylhexanoate | 134.5 gms |
| n-butyl acetate | 401.1 gms |

The non-volatile solids tested at 69.1%; Gardner-Holdt viscosity at U+1/2; and weight average molecular weight ($M_w$) at 9800.

Resin 5 (Acetoacetate Containing Acrylic Polymer)

A 12 liter glass reactor equipped with stirrer, condenser, dual above surface feeds and a nirogen blanket was charged with 753.7 gms of n-butyl acetate and heated to reflux. The following solutions (Part A) and (Part B) were prepared and fed simultaneously into the reactor at reflux. Part A was fed over 210 minutes and Part B was fed over 270 minutes. Following the addition of Part B the reactor vessel was held at reflux for 60 minutes.

| Part A | |
|---|---|
| Acetoacetoxyethyl methacrylate | 947.55 gms |
| Hydroxyethyl methacrylate | 162.44 gms |
| n-butyl acrylate | 785.11 gms |
| Isobornyl methacrylate | 812.19 gms |
| n-butyl acetate | 26.92 gms |
| Part B | |
| t-butylperoxy-2-ethylhexanoate | 108.29 gms |
| n-butyl acetate | 403.78 gms |

The non-volatile solids tested at 68.4%; Gardner-Holt viscosity was U1/2; and weight average molecular weight ($M_w$) at 12100.

Resin 6. Structured Acetoacetate Reactive Diluent (PE/MHHPA/EO/AcAc)

To a vessel rated for high pressure Charge-I, shown below, was added and the batch was heated to 140° C. Charge-II, shown below, was then added over a one hour interval, followed by continued heating for 6 hours. The batch was cooled to 25° C. and Charge II, shown below, was added, and followed by heating at 110° C. for 6 hours. Residual ethylene oxide was removed by purging with nitrogen. The acid number on solids was tested at less than 10 mg KOH/gram. Charge-IV, shown below, was added and the batch was heated to 120° C. and 296 g tert-butylalcohol were removed thereafter during distillation. The acid number of the reaction mixture was less than 5. The mixture cooled to room temperature was a clear solution. Gardner-Holdt viscosity=V+1/2 at 82.7% solids.

| Ingredients | Parts by Weight (grams) |
|---|---|
| Charge-I | |
| 2-Heptanone | 303 |
| Pentaerythritol | 136 |
| Triethylamine | 0.23 |
| Charge-II | |
| Methylhexahydrophthalic anhydride[1] | 654 |
| Charge-III | |
| Ethylene oxide | 176 |
| Charge-IV | |
| Tert-butylacetoacetate (TBAA) | 632 |
| Total | 1901.23 |

[1]Milldride ® Methylhexahydrophthalic anhydride supplied by Milliken Chemical Company.

Hardness Measurement on Clear Films by Persoz Method

The coating compositions in Table 1 were evaluated for cure rate by measuring Persoz hardness over time. The various examples in Table 1 were applied over a steel panel using a 10 mil doctor blade to get a ambient dry film thickness of about 2 mils. The change in cure rate was followed by measuring the film hardness over time using a Persoz hardness tester (Table 2). The larger the Persoz number the harder the film and therefore the more productive the ensuing coating.

TABLE 1

Clear coating formulations for Persoz Hardness measurements
Total acetoacetate:ketimine is 1.0:1.0

| Ingredients | Comparative 1 | Example 2 | Example 3 | Example 4 | Example 5 |
|---|---|---|---|---|---|
| Resin 3 | 50 g | 50 g | 50 g | 40 g | 50 g |
| Resin 2 | | 17.5 g | 25 g | | |
| Resin 4 | | | | 53 g | |
| Resin 6 | | | | | 40 g |
| Acetone | 10 g | 10 g | 10 g | 10 g | 10 g |
| Butyl acetate | 20 g | 20 g | 20 g | 15 g | 20 g |
| Catalyst solution | 1.4 g | 2.6 g | 3.2 g | 2.3 g | 2.9 g |
| Setalux 10-1440 | 26.7 g | 79.1 g | 102 g | 42.6 g | 65.3 g |

Resin 1: Epon 1004F modified with Acetoacetate groups.
Resin 2: pentaerythrytol tetraacetoacetate
Resin 3: Epon 1001F modified with Acetoacetate groups
Resin 4: acrylic polymer (35 wt % methacryloyl acetoacetate/6 wt % hydroxyethyl acrylate/30 wt % isobornyl methacrylate/29 wt % n-butyl acrylate). Mw=9.8 K.
Resin 6: Pentaerythrytol/methylhexahydropthallic anhydride/ethylene oxide/acetoacetate oligomer. Setalux 10-1440: Supplied by Akzo Nobel Resin, Louiseville Ky. 40209. Catalyst solution: Solution of 10 wt % benzoic acid and 13.6 wt % triethyl amine in xylene, isobutanol. Amount of catalyst solution used is 2.5% of total resin solids.

TABLE 2

Persoz Hardness measurements on Clears from Table 1

| Ingredient | Film build, mil | 3 Hour[3] | 5 Hour[3] | 24 Hour[3] |
|---|---|---|---|---|
| Comparative 1 | 2.0 | 28 | 35 | 103 |
| Example 2 | 2.0 | 49 | 63 | 148 |
| Example 3 | 2.0 | 87 | 131 | 231 |
| Example 4 | 2.0 | 70 | 87 | 155 |
| Example 5 | 2.0 | 42 | 59 | 152 |

[3]The numbers in columns refer to Persoz hardness or Persoz oscillations.

It is clearly seen from Table 2 that Examples 2 through 5 exhibit higher early hardness (3 hours Persoz hardness) and higher 5 hour and 24 hour Persoz hardness than the comparative Example 1 thereby indicative of faster dry times when compared to the comparative Example 1.

The comparative example 1 is taught in U.S. Pat. No. 5,332,785 and is incorporated here for comparison.

What is claimed is:

1. A coating composition comprising:
   a binder component comprising:
      (i) an epoxy resin having at least one acetoacetate functionality and at least one epoxy group, and one or more reactive components provided with at least two acetoacetate functionalities, said reactive component being selected from the group consisting of a structured reactive diluent, an acrylic polymer, a polyester, and a combination thereof; and
      (ii) a crosslinking component selected from the group consisting of a polyamine, a blocked polyamine and a mixture thereof, wherein said polyamine has an average of at least two amine functionalities per polyamine molecule and wherein said blocked polyamine has an average of at least two imine functionalities per molecule.

2. The coating composition of claim 1 further comprising at least one organosilane having at least one epoxy or amino group.

3. The coating composition of claim 1 or 2 wherein said blocked polyamine is a polyketimine or polyaldimine.

4. The coating composition of claim 1 wherein the GPC weight average molecular weight of said epoxy resin ranges 100 from 30,000.

5. The coating composition of claim 1 wherein the GPC weight average molecular weight of said epoxy resin 100 to 10000.

6. The coating composition of claim 1 wherein said composition has a low VOC.

7. The coating composition of claim 1 comprising 5 to 90 weight percent of said epoxy resin based on total weight of binder component solids.

8. The coating composition of claim 1 comprising 5 to 90 weight percent of said structured reactive diluent, said acrylic polymer, or said polyester based on total weight of binder component solids.

9. The coating composition of claim 1 wherein the GPC weight average molecular weight of said structured reactive diluent ranges 100 from 30,000.

10. The coating composition of claim 1 wherein the GPC weight average molecular weight of said acrylic polymer ranges 1000 from 100,000.

11. The coating composition of claim 1 wherein the GPC weight average molecular weight of said polyester ranges 1000 from 50,000.

12. The coating composition of claim 1 wherein the GPC weight average molecular weight of said polyamine or said blocked polyamine ranges from 100 to 50,000.

13. The coating composition of claim 1 comprising 10 to 90 weight percent of said crosslinking component based on total weight of binder component solids.

14. The coating composition of claim 1 wherein said structured diluent is a reaction product of a structured hydroxy diluent having a GPC weight average molecular weight ranging from 80 to 2000 with an acetoacetatic acid derivative.

15. The coating composition of claim 14 wherein said structured hydroxy diluent is pentaerythritol and wherein said acetoacetate compound is t-butyl acetoacetate.

16. The coating composition of claim 14 wherein said structured hydroxy diluent is trimethylol propane.

17. The coating composition of claim 14 wherein said structured hydroxy diluent is a reaction product of pentaerythritol with methylhexahydrophthalic anhydride further reacted with 2 to 10 carbon atom aliphatic epoxide.

18. The coating composition of claim 14 wherein said structured hydroxy diluent is a reaction product of pentaerythritol with 4 to 10 carbon atom aliphatic lactone further reacted with 2 to 10 carbon atom aliphatic epoxide.

19. A method of producing a coating on a substrate comprising:

mixing a binder component with a crosslinking component of a coating composition to form a pot mix, wherein said binder component comprises:
(i) an epoxy resin having at least one acetoacetate functionality and at least one epoxy group, and
(ii) one or more reactive components provided with at least two acetoacetate functionalities, said reactive component being selected from the group consisting of a structured reactive diluent, an acrylic polymer, a polyester, and a combination thereof; and wherein said crosslinking component is selected from the group consisting of a polyamine, a blocked polyamine and a mixture thereof, wherein said polyamine has an average of at least two amine functionalities per polyamine molecule and wherein said blocked polyamine has an average of at least two imine functionalities per molecule;

applying a layer of said pot mix over a substrate surface; and curing said layer under ambient conditions to form said coating on said substrate.

20. The method of claim 19 wherein said substrate is an automotive body.

* * * * *